(12) United States Patent
Mizuno et al.

(10) Patent No.: US 8,280,275 B2
(45) Date of Patent: Oct. 2, 2012

(54) COMBINATION GEAR, DETACHABLE UNIT, AND IMAGE FORMING APPARATUS USING THESE

(75) Inventors: Hiroshi Mizuno, Aisai (JP); Isamu Kugimiya, Toyokawa (JP); Takeshi Hashimoto, Okazaki (JP); Naoto Yoshida, Toyokawa (JP); Nozomu Kondo, Toyokawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1206 days.

(21) Appl. No.: 12/102,452

(22) Filed: Apr. 14, 2008

(65) Prior Publication Data
US 2009/0031853 A1 Feb. 5, 2009

(30) Foreign Application Priority Data
Aug. 2, 2007 (JP) .................................. 2007-201674

(51) Int. Cl.
*G03G 15/00* (2006.01)
*G03G 15/20* (2006.01)
(52) U.S. Cl. ........................ 399/110; 399/328
(58) Field of Classification Search .................. 399/110, 399/328, 167; 74/405, 406, 414, 390, 397, 74/398, 399, 570.1, 570.2, 570.3, 352; 475/169, 475/170, 162, 163, 165, 175; 192/54.1, 41 R, 192/37, 20, 89.1
See application file for complete search history.

(56) References Cited

U.S. PATENT DOCUMENTS

| 500,322 | A | * | 6/1893 | Dronsfield | 475/162 |
| 2,181,162 | A | * | 11/1939 | Zaenger | 475/169 |
| 3,204,737 | A | * | 9/1965 | Anner | 192/54.1 |
| 3,217,566 | A | * | 11/1965 | Sanson | 475/175 |
| 3,320,828 | A | * | 5/1967 | Grant | 475/175 |
| 3,478,623 | A | * | 11/1969 | Noguchi | 475/165 |
| 5,102,377 | A | * | 4/1992 | Spanski | 475/162 |
| 8,057,346 | B2 | * | 11/2011 | Liu | 475/162 |

FOREIGN PATENT DOCUMENTS

| CN | 1182891 | 5/1998 |
| JP | 8-16070 | 1/1996 |
| JP | 8-270642 | 10/1996 |

(Continued)

OTHER PUBLICATIONS

Japanese Office Action mailed on Jul. 28, 2009, directed towards corresponding Patent Application No. 2007-201674; 6 pages.

(Continued)

*Primary Examiner* — Susan Lee
(74) *Attorney, Agent, or Firm* — Morrison & Foerster LLP (57) ABSTRACT

A combination gear having a simple structure is provided at low cost without increasing a number of components. In at least two gears adjacent in an axial line direction and having a same rotation direction, three engaging portions arranged in a regular triangle are formed at an end of one of the adjacent gears and a regular triangle engaging hole is formed at an end of another gear. The engaging portions and the engaging hole fit together with play remaining, and when one of the gears rotates, the three engaging portions and three surfaces of the engaging hole engage such that the other gear rotates coaxially, and when rotation stops, the engaging portions and the engaging hole move in a direction orthogonal to the axial line by a play amount and become eccentric.

13 Claims, 12 Drawing Sheets

FOREIGN PATENT DOCUMENTS

| | | |
|---|---|---|
| JP | 11-22742 | 1/1999 |
| JP | 2001-117350 | 4/2001 |
| JP | 2001-130274 | 5/2001 |
| JP | 2001-159450 | 6/2001 |
| JP | 2002-179343 | 6/2002 |
| JP | 2005-241946 | 9/2005 |

OTHER PUBLICATIONS

Chinese Office Action dated May 25, 2011, directed to Chinese Application No. 200810144077.0; 16 pages.

* cited by examiner

COMBINATION GEAR, DETACHABLE UNIT, AND IMAGE FORMING APPARATUS USING THESE

This application is based on application No. 2007-201674 filed in Japan on Aug. 2, 2007, the contents of which are hereby incorporated by reference.

BACKGROUND OF THE INVENTION

1. Field of the Invention

The present invention relates to a combination gear used in a drive system device of an image forming apparatus and the like, a detachable unit, and an image forming apparatus using these.

2. Description of the Related Art

In image forming apparatuses such as copying machines, printers, facsimile machines, and multi-function machines, generally a coupling and gears are employed as means for transmitting motive power from the image forming apparatus main unit to a detachable unit such as a consumables cartridge of toner or the like or a paper supply cassette.

The coupling connects a main unit-side drive shaft and a driven shaft provided on the cartridge or the detachable unit in an axial direction.

For example, JP 2005-241946A proposes a configuration in which a coupling in which a triangular hole is formed is provided on an image forming unit side and a triangular columnar joint is provided on a main unit side. Drive transmission means based on this coupling have a problem in that a shaft bearing or a spring or the like is required and there are a large number of components.

The gears connect a driving gear on the main unit side and a driven gear provided on the cartridge or the detachable unit from a radial direction. In drive coupling means using gears, since the rotation direction of the gears and the relative position of the driving gear and the driven gear in the mounting direction of the cartridge or detachable unit are limited, the drive system becomes long and the number of components such as gears and caulking shafts increases. Moreover, in order to prevent damage due to impact between the tooth tops of the driving gear and the driven gear when the cartridge or detachable unit is mounted, it is necessary to provide a one-way mechanism in the coupling portion.

In providing the one-way mechanism, a commonly known one-way clutch may be interposed between the driving gear or the driven gear and the shaft thereof such that when the gear rotates in one direction, the rotational force is transmitted to the shaft via the one-way clutch and the shaft rotates integrally, and when the gear rotates in another direction, transmission of the rotational force to the shaft is cut off by the one-way clutch. This involves problems in that costs and the number of components are increased.

In printers, which are the basis of multi-function machines, in order to enable full front access to ensure excellent operability in which paper restocking, paper jam processing, consumables replacements and the like can be carried out from the front of the apparatus, it is common for the direction in which paper travels from the paper supply cassette to be set to a front-to-back direction with respect to the front of the apparatus. However, in consideration of mounting optional units such as finishers, ease of use is provided for the user by setting the direction in which paper travels from the paper supply cassette to a lateral direction with respect to the front of the apparatus. Thus, the front of the base printer becomes the right side or the left side in the multi-function machine, and paper restocking and replacements of consumables cartridges such as toner are carried out from the right side (or left side) with respect to the front of the multi-function machine, which is a problem in that operability is inferior. In order to improve operability, it is necessary to ensure that paper restocking and replacements of consumables cartridges such as toner can be carried out from the front of the multi-function machine, that is, from the left side (or right side) of the base printer. This necessitates large-scale change of the drive system and the like.

SUMMARY OF THE INVENTION

The present invention has been devised in light of the above-described conventional problems and it is an object thereof to provide a combination gear having a simple structure at low cost without increasing a number of components, a detachable unit using this, and an image forming apparatus.

A first aspect of the present invention is to provide a fundamental combination gear.

Namely, at least two gears adjacent in an axial line direction and having a same rotation direction, wherein three engaging portions arranged in a regular triangle are formed at an end of one of the adjacent gears and a regular triangle engaging hole is formed at an end of another gear, and the engaging portions and the engaging hole fit together with play remaining, and when one of the gears rotates, the three engaging portions and three surfaces of the engaging hole engage such that the other gear rotates coaxially, and when rotation stops, the engaging portions and the engaging hole move in a direction orthogonal to the axial line by a play amount and become eccentric.

A second aspect of the present invention is to provide a detachable unit provided with a combination gear.

Namely, a detachable unit, which is detachably mounted on a main unit of an image forming apparatus and to which driving force is transmitted from a driving gear provided on the main unit, wherein the detachable unit comprises the combination gear according to the first aspect, and when the detachable unit is mounted on the main unit, the combination gear of the detachable unit meshes with the driving gear of the main unit.

A third aspect of the present invention is to provide an image forming apparatus provided with a combination gear on its main unit.

Namely, an image forming apparatus having a detachable unit, which is detachably mounted on a main unit of the image forming apparatus and to which driving force is transmitted from a driving gear provided on the main unit, wherein the driving gear of the main unit comprises the combination gear according to the first aspect, and when the detachable unit is mounted on the main unit, a gear of the detachable unit meshes with the combination gear of the main unit.

A fourth aspect of the present invention is to provide an image forming apparatus that uses a combination gear in the driving gear that drives a pair of rollers through which paper passes.

Namely, an image forming apparatus, which has in a main unit thereof a pair of rollers through which paper passes and a driving gear that meshes with a gear provided on either one of the pair of rollers, wherein the driving gear of the main unit comprises the combination gear according to the first aspect.

DESCRIPTION OF THE PREFERRED EMBODIMENTS

Hereinafter, embodiments of the present invention are described with reference to the accompanying drawings.

Figure 1:
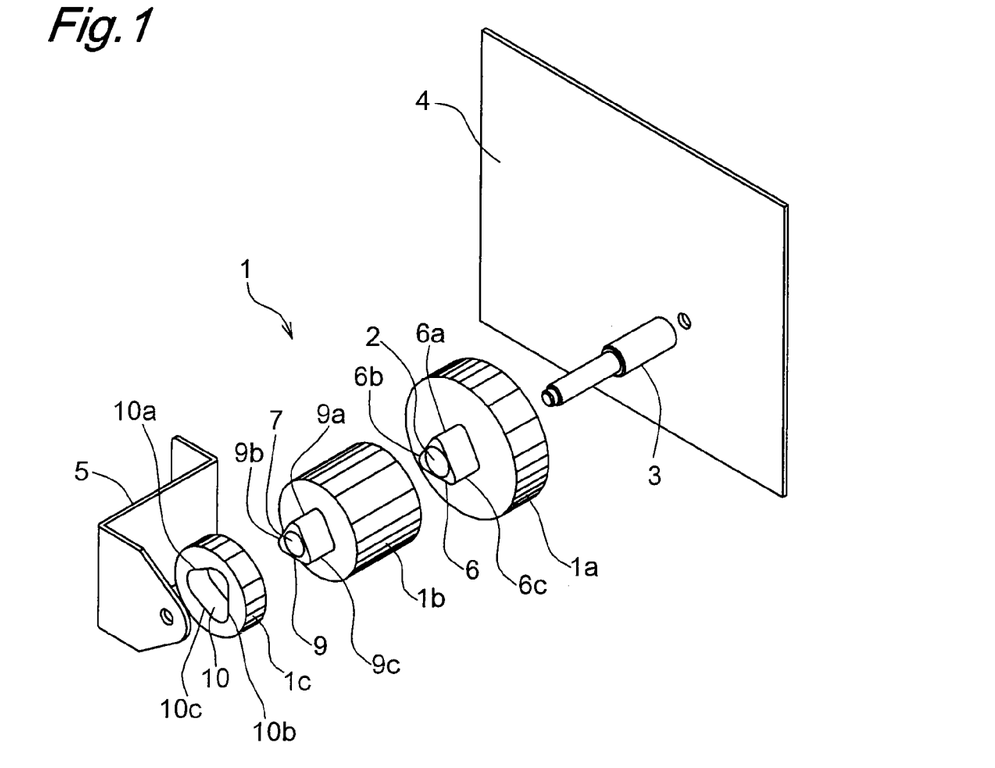
FIG. 1 is an exploded perspective view of a combination gear according to the present invention.
Figure 2:
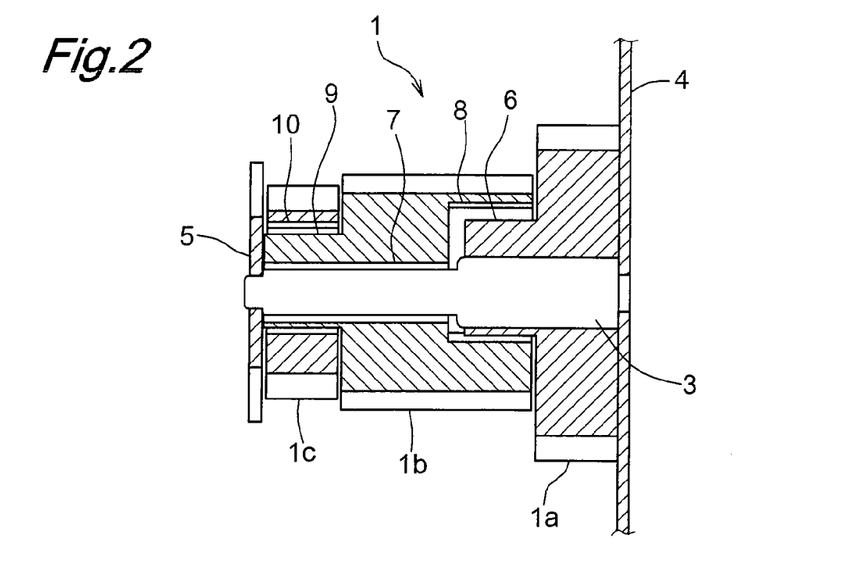
FIG. 2 is an assembled cross-sectional view of the combination gear of FIG. 1.

FIG. 1 and FIG. 2 show an embodiment of a combination gear 1 according to the present invention. The combination gear 1 is constituted by three gears, namely a first gear 1a, a second gear 1b, and a third gear 1c.

The first gear 1a has a hole 2 in a center thereof and is rotatably supported by a support shaft 3 that fits into the hole 2. One end of the support shaft 3 is caulked and secured into a frame 4. Another end of the support shaft 3 is held by a retaining plate 5 that attaches to the frame 4. A columnar protruding portion 6 having a cross sectional configuration in which vertexes of a regular triangle are beveled to form circular arcs is provided coaxially to the support shaft 3 on an end surface of the first gear 1a on an opposite side from the frame 4. The three vertexes of the protruding portion 6 form engaging portions 6a, 6b, and 6c in the present embodiment.

Figure 3:
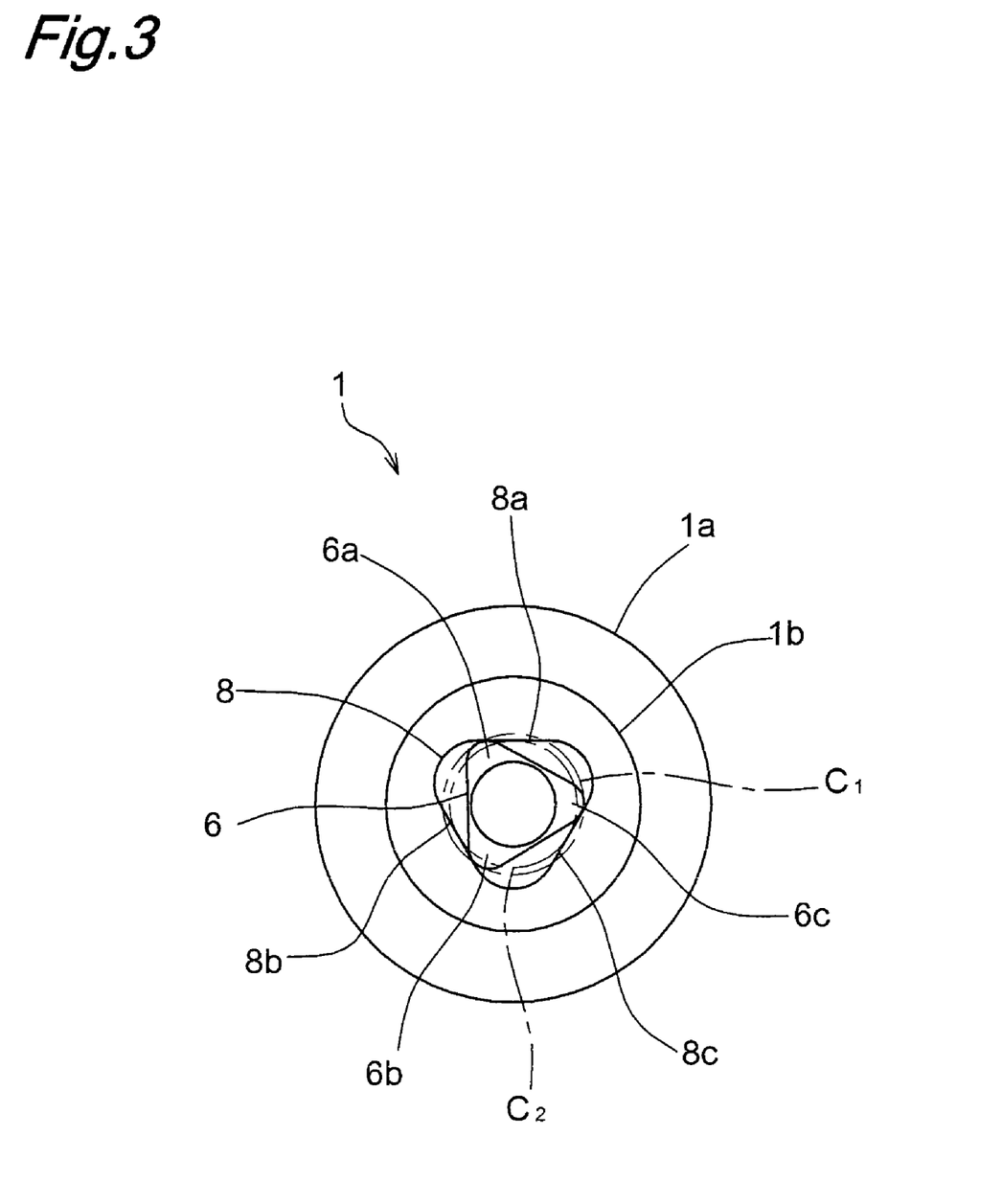
FIG. 3 is an axial view of the combination gear of FIG. 1.

The second gear 1b has a hole 7 in a center thereof and is fitted with play remaining on the support shaft 3 so as to be adjacent to the first gear 1a. An engaging hole 8 having a cross sectional configuration in which vertexes of a regular triangle have undergone inner surface processing to form circular arcs is provided coaxially to the support shaft 3 on an end surface of the second gear 1b facing the first gear 1a. The engaging hole 8 is of a size by which the three engaging portions 6a, 6b, and 6c of the protruding portion 6 of the first gear 1a can fit into with axial play remaining. However, as shown in FIG. 3, a circumscribed circle $C_1$ of the three engaging portions 6a, 6b, and 6c is larger than an inscribed circle $C_2$ of three surfaces 8a, 8b, and 8c of the engaging hole 8. In a same manner as for the first gear 1a, a columnar protruding portion 9 having a cross sectional configuration in which vertexes of a regular triangle are beveled to form circular arcs is provided coaxially to the support shaft 3 on an end surface of the second gear 1b on an opposite side from the engaging hole 8. The three vertexes of the protruding portion 9 form engaging portions 9a, 9b, and 9c in the present embodiment.

The third gear 1c has an engaging hole 10 having a cross sectional configuration in which vertexes of a regular triangle in a center thereof have undergone inner surface processing to form circular arcs, and is fitted with play remaining onto the protruding portion 9 of the second gear 1b so as to be adjacent to the second gear 1b. The engaging hole 10 is of a size by which the three engaging portions 9a, 9b, and 9c of the protruding portion 9 of the second gear 1b can fit into with axial play remaining. However, as shown in FIG. 3, a circumscribed circle of the three engaging portions 9a, 9b, and 9c of the protruding portion 9 is larger than an inscribed circle of three surfaces 10a, 10b, and 10c of the engaging hole 10 in a same manner as the relationship between the protruding portion 6 of the first gear 1a and the engaging hole 8 of the second gear.

Figure 4A:
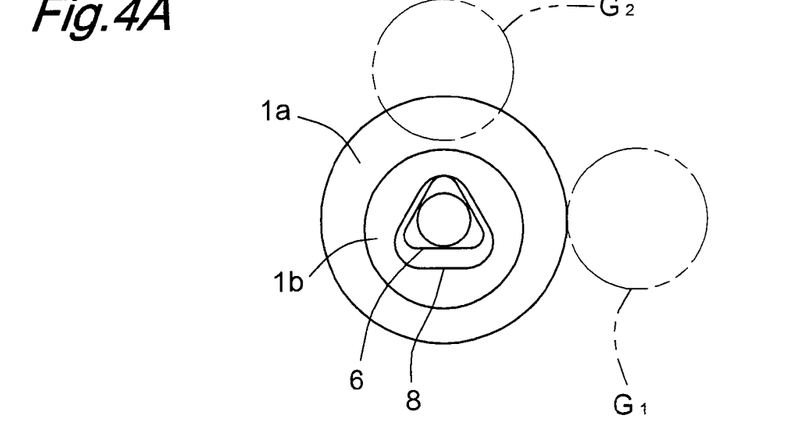
FIGS. 4A, 4B, 4C are axial views illustrating operation of the combination gear of FIG. 1.
Figure 4B:
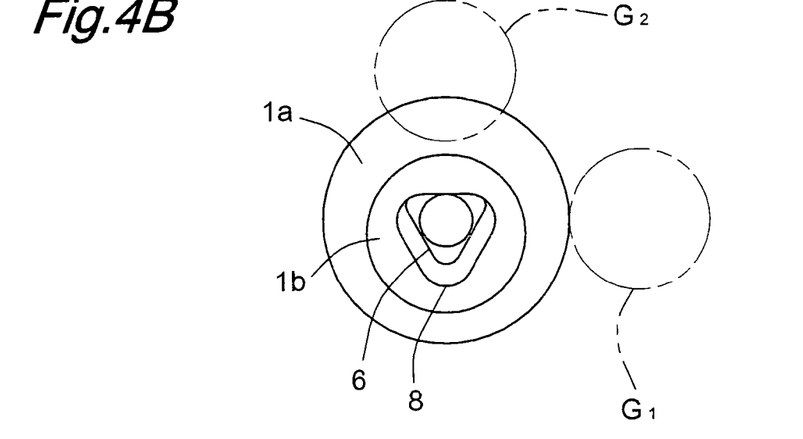

The first gear 1a of the thus-configured combination gear 1 rotates centered on the support shaft 3 by having driving force of an unshown motor transmitted via a gear $G_1$. In a state in which the first gear 1a does not rotate, the second gear 1b is displaced from the first gear 1a as shown in FIGS. 4A and 4B in a direction at a right angle to the support shaft 3, that is, a radial direction. Furthermore, the third gear 1c is also displaced from the second gear 1b in the radial direction.

Figure 4C:
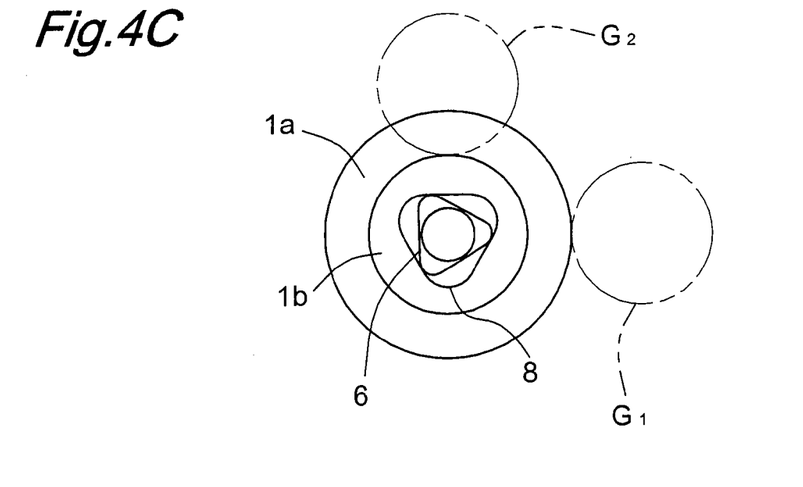

When the first gear 1a rotates, the three engaging portions 6a, 6b, and 6c of the protruding portion 6 of the first gear 1a contact the three surfaces 8a, 8b, and 8c of the engaging hole 8 of the second gear 1b. Due to this, a shaft core of the second gear 1b coincides with the first gear 1a as shown in FIG. 4C and the second gear 1b rotates integrally with the first gear 1a such that driving force is transmitted to a gear $G_2$ that meshes with the second gear 1b. Similarly, due to rotation of the second gear 1b, the three engaging portions 9a, 9b, and 9c of the protruding portion 9 of the second gear 1b contact the three surfaces 10a, 10b, and 10c of the engaging hole 10 of the third gear 1c. Due to this, a shaft core of the third gear 1c coincides with the second gear 1b, and the third gear 1c rotates integrally with the second gear 1b such that driving force is transmitted to an unshown gear that meshes with the third gear 1c.

When rotation of the first gear 1a stops, the second gear 1b and the third gear 1c move due to their own weight in a radial direction from the first gear 1a and the second gear 1b respectively and become eccentric. Due to this, the second gear 1b and the third gear 1c become unmeshed from the respective gears on the downstream side in a power transmission direction.

In this manner, in the combination gear 1 according to the present embodiment, the first gear 1a and the second gear 1b as well as the second gear 1b and the third gear 1c are in a mutually displaced state at times other than during power transmission. For this reason, coupling of the second gear 1b and the gear and coupling of the third gear 1c and the gear can be carried out easily, and a one-way structure becomes unnecessary, thereby achieving a simple structure at low cost without increasing the number of components.

Figure 5A:
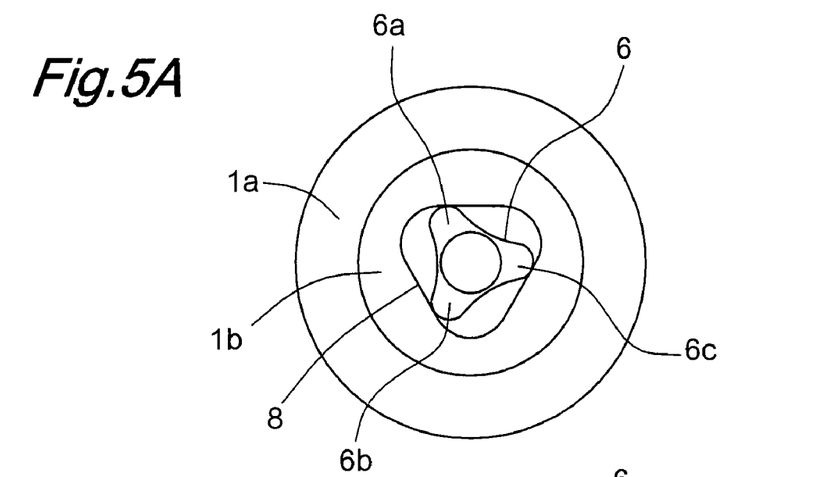
FIGS. 5A, 5B, 5C are axial views illustrating a modified example of the combination gear according to the present invention.
Figure 5B:
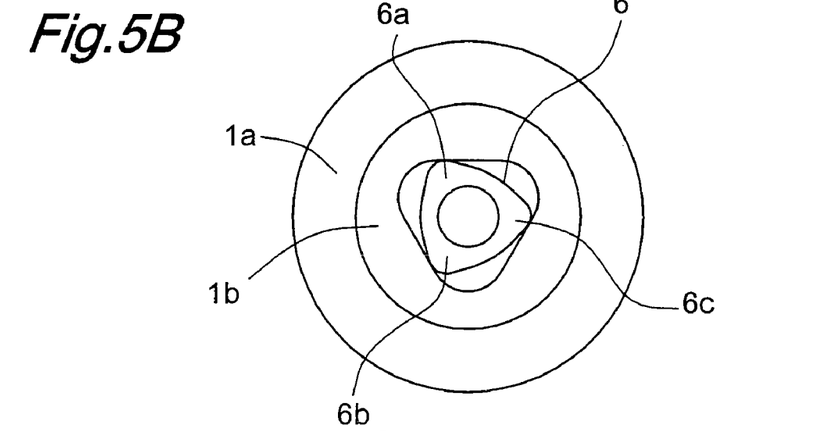
Figure 5C:
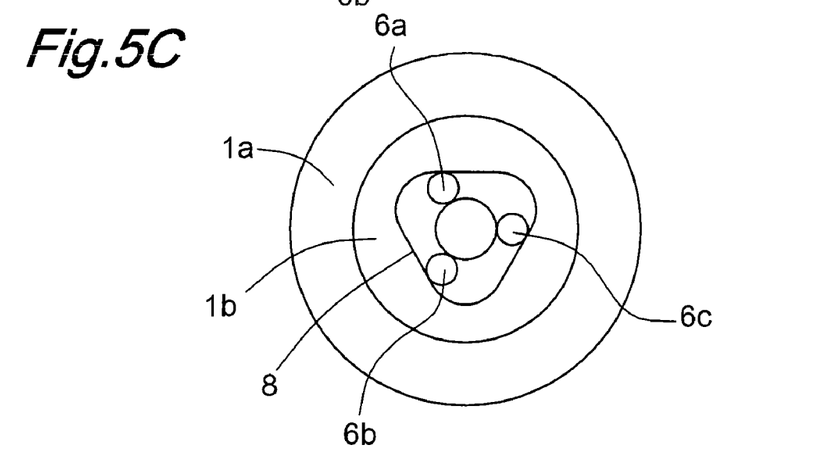

FIG. 5 shows modified examples of the triangular columnar protruding portions 6 and 9 of the first gear 1a and the second gear 1b according to the foregoing embodiment. In the embodiments of FIGS. 1 to 4, the surfaces between the engaging portions 6a, 6b, and 6c are flat, but in FIG. 5A, there are concave surfaces between the engaging portions 6a, 6b, and 6c, in FIG. 5B there are convex surfaces between the engaging portions 6a, 6b, and 6c, and in FIG. 5C each of the engaging portions 6a, 6b, and 6c is formed as a cylinder and there are spaces between the engaging portions 6a, 6b, and 6c. All of these achieve an equivalent operation and effect as the combination gear of FIGS. 1 to 4.

Figure 6:
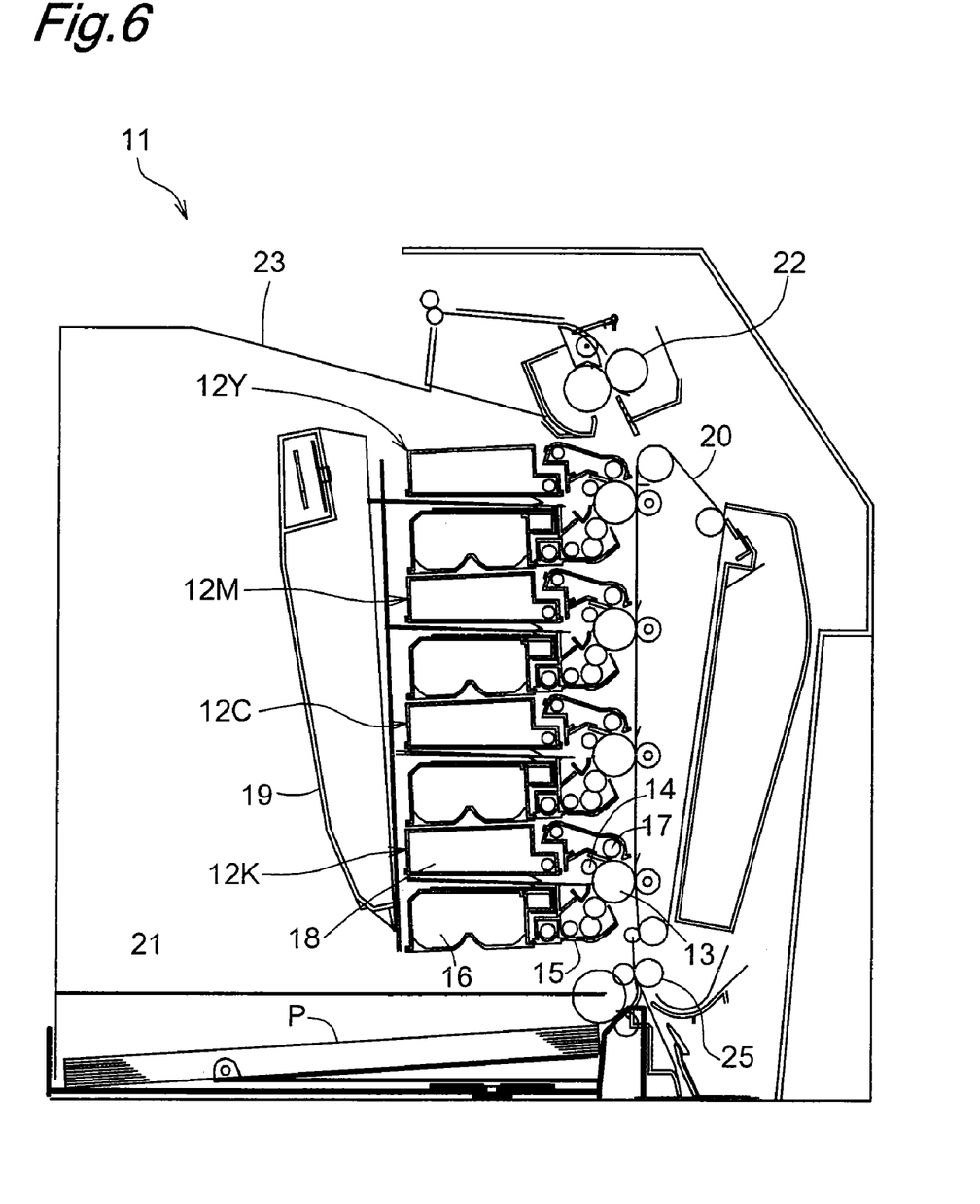
FIG. 6 is an outline cross-sectional view of an image forming apparatus.

FIG. 6 is a cross-sectional view of an image forming apparatus in which a combination gear according to the present invention is applied. First, description is given of the image forming apparatus and its operation.

An image forming apparatus 11 is a tandem-type color laser printer in which four imaging cartridges 12Y, 12M, 12C, and 12K of yellow, magenta, cyan, and black are arranged in a vertical direction. Each of the imaging cartridges 12 (12Y, 12M, 12C, and 12K) comprises a charging device 14, a developing apparatus 15, a new toner box 16, a cleaning apparatus 17, and a waste toner box 18 which arranged at a periphery of a rotatably provided cylindrical photosensitive structure 13. In these imaging cartridges 12, an electric charge is applied to the photosensitive structure 13 by the charging device 14, and an electrostatic latent image is formed by an exposure apparatus 19 based on image signals, and this electrostatic latent image is developed by the developing apparatus 15. The developed toner image is transferred to a paper P, which is transported between a transfer belt 20 and the photosensitive structure 13 from a paper supply unit 21 via a timing roller 25. Residual toner on the photosensitive structure 13 after transfer is collected in the waste toner box 18 by the cleaning apparatus 17. The paper P on which the toner image has been transferred is transported to a fixing unit 22 and, after the toner image has been fixed here, is discharged to a paper tray 23. It should be noted that the image forming apparatus 11 is a type in which the front is at right side in FIG. 6, and paper is supplied in a frontward direction from the paper supply unit 21 as viewed from the from the front, then transported vertically and discharged in a backward direction. The paper supply unit 21 can be attached and removed from the front, and when a front surface door is opened, the transfer belt 20 and the imaging cartridges 12 can be attached and removed from the front.

Figure 7:
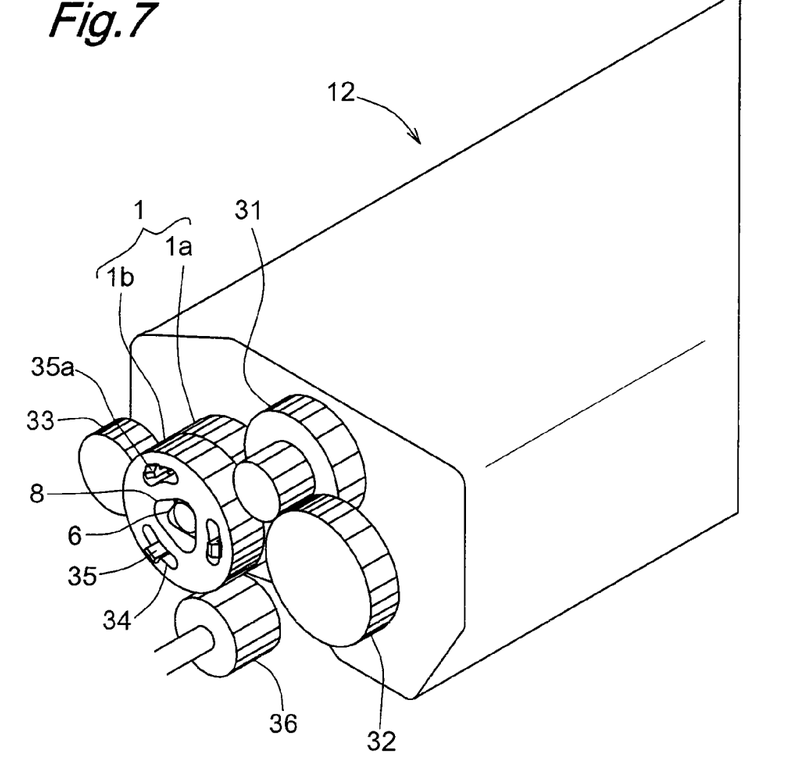
FIG. 7 is a perspective view illustrating a meshing condition of gears between a detachable unit and a main unit of the image forming apparatus using the combination gear according to the present invention.

FIG. 7 shows the imaging cartridges 12 of the image forming apparatus of FIG. 6 provided on the combination gear 1 of the present embodiment. The imaging cartridge 12 in FIG. 7 is drawn in a form in which the developing apparatus 15 of the imaging cartridge 12 of FIG. 6 has been simplified. (Hereinafter, the imaging cartridge 12 is referred to as a detachable unit 12.)

The combination gear 1 of the present embodiment, an intermediate gear 31, a developing roller gear 32, and a stirring roller gear 33 are rotatably attached at an end of the detachable unit 12.

The combination gear 1 is constituted by the first gear 1a and the second gear 1b. The fundamental structure is equivalent to that shown in FIGS. 1 and 2, and therefore same reference numerals are used for convenience and detailed description is omitted. The protruding portion 6 of the first gear 1a fits into the engaging hole 8 of the second gear 1b with play remaining. Three circular arc holes 34 are formed so that the second gear 1b does not separate from the first gear 1a, and elastic pieces 35 that are provided protruding from the first gear 1a are inserted into these holes 34, while tabs 35a at ends of the elastic pieces 35 fit tightly at the edges of the holes 34. The first gear 1a is secured to a shaft of a supply roller inside the detachable unit 12. The second gear 1b meshes with a driving gear 36 provided on the main unit of the image forming apparatus 11. The driving gear 36 is driven by an unshown motor.

The intermediate gear 31 meshes with the first gear 1a of the combination gear 1 and meshes with the developing roller gear 32. The developing roller gear 32 is secured to a shaft of a developing roller inside the detachable unit 12 and meshes with the intermediate gear 31. The stirring roller gear 33 is secured to a shaft of a stirring roller inside the detachable unit 12 and meshes with the second gear 1b of the combination gear 1.

The detachable unit 12 is mounted to the main unit and in a state in which the driving gear 36 is not driving, the second gear 1b of the combination gear 1 provides looseness in the radial direction. When the driving gear 36 performs driving, the second gear 1b rotates and the engaging hole 8 of the second gear 1b and the protruding portion 6 of the first gear 1a engage, and as a result the first gear 1a rotates. Due to rotation of the first gear 1a, the developing roller gear 32 rotates via the intermediate gear 31. Due to rotation of the second gear 1b, the stirring roller gear 33 rotates. When the driving gear 36 stops, the second gear 1b of the combination gear 1 again provides looseness in the radial direction. For this reason, when the detachable unit 12 is removed and remounted, the coupling of the driving gear 36 and the second gear 1b can be carried out smoothly.

Figure 8A:
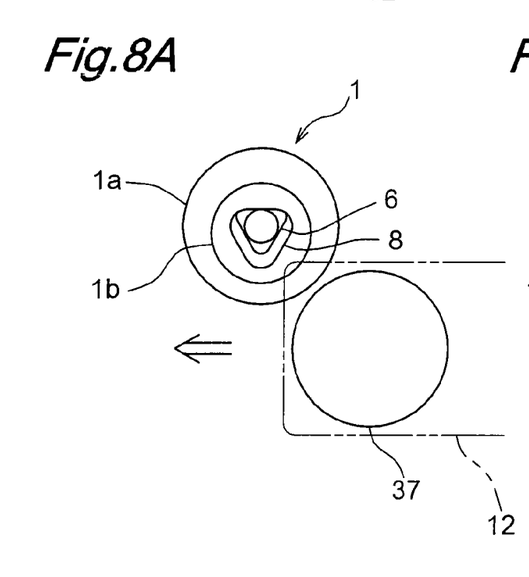
FIGS. 8A, 8B are axial views illustrating an operation when the gears of the main unit and the detachable unit of the image forming apparatus using the combination gear according to the present invention mesh.
Figure 8B:
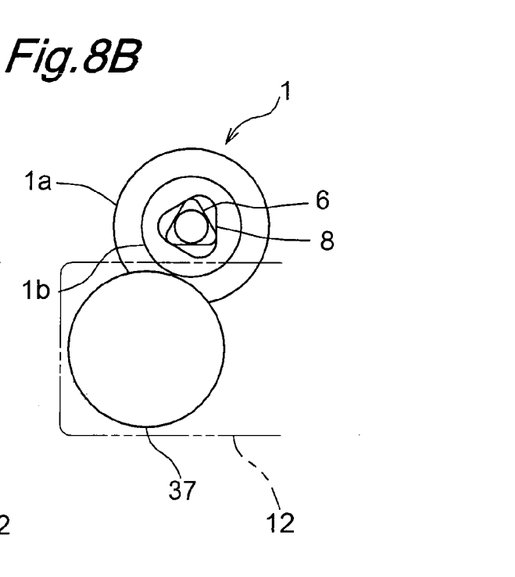

Contrary to FIG. 7, in FIG. 8 a combination gear 1 according to the present embodiment is provided on the main unit side of the image forming apparatus 11, and a gear 37 that meshes with the combination gear 1 is provided on the detachable unit. The combination gear 1 is constituted by the first gear 1a and the second gear 1b, and the protruding portion 6 of the first gear 1a fits into engaging hole 8 of the second gear 1b with play remaining, and the second gear 1b moves downward due to gravity such that its core and that of the first gear 1a are displaced. The first gear 1a is driven by a motor via an unshown driving gear. The second gear 1b is configured to mesh with an arbitrary gear of the detachable unit 12 at an inner side position as viewed from the mounting direction (a position in the drawing on the left side from a center line of the combination gear).

When the detachable unit 12 is mounted, the gear 37 of the detachable unit 12 moves in an arrow direction, passes below the second gear 1b of the main unit-side combination gear 1, and meshes while pushing up the second gear 1b. For this reason, the coupling of the gear 37 of the detachable unit 12 and the main unit-side second gear 1b can be carried out smoothly.

When the first gear 1a of the combination gear 1 is driven by the unshown motor, the protruding portion 6 of the first gear 1a and the engaging hole 8 of the second gear 1b engage, and as a result the second gear 1b rotates. Due to rotation of the second gear 1b, the gear 37 of the detachable unit rotates and the detachable unit operates.

Figure 9A:
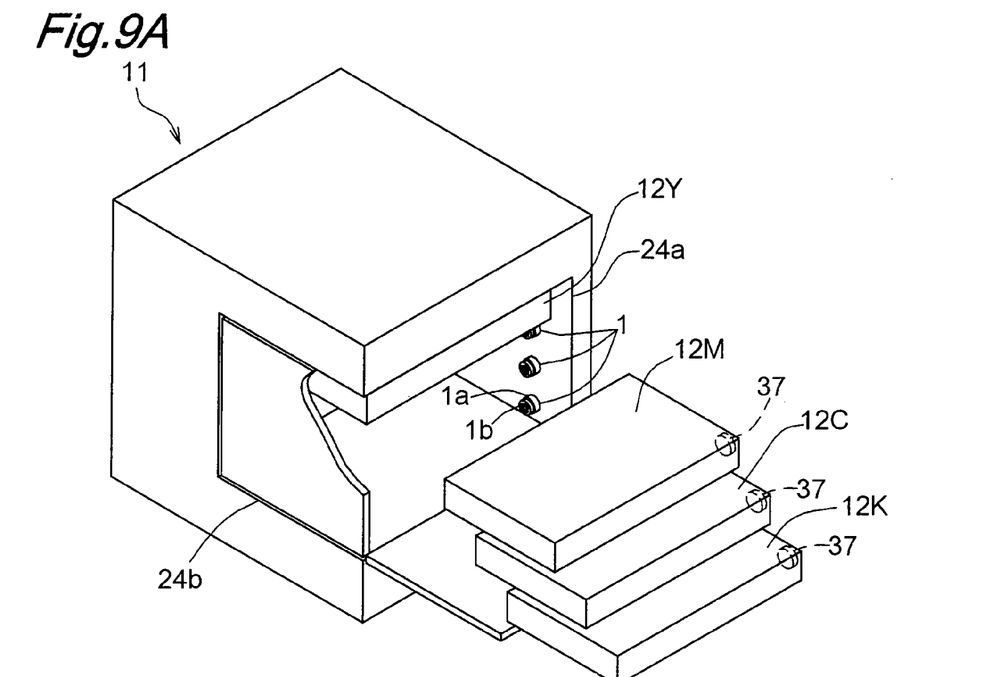
FIGS. 9A, 9B are perspective views illustrating meshing directions of gears between the main unit and the detachable units of the image forming apparatus using combination gears according to the present invention.
Figure 9B:
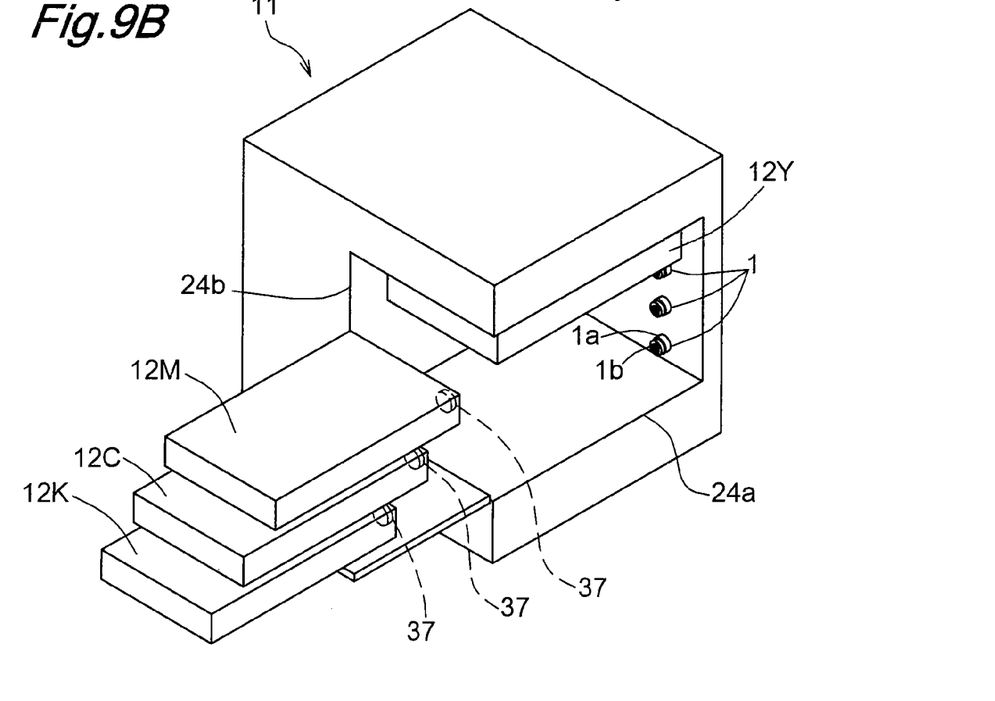

FIG. 9 shows an example in which four combination gears 1 according to the present embodiment are provided on the main unit side of the image forming apparatus 11, and gears 37 that mesh with the combination gear 1 are provided on the side of the detachable units 12 (12Y, 12M, 12C, and 12K). FIG. 9A shows a type in which the detachable units 12 are attached and removed from the front of the image forming apparatus 11. In this case, the gears 37 of the detachable units 12 are configured so as to mesh with the second gears 1b of the main unit combination gear 1 from the radial direction. FIG. 9B shows a type in which the detachable units 12 are attached and removed from a side of the image forming apparatus 11. In this case, the gears 37 of the detachable units 12 are configured so as to mesh with the second gears 1b of the main unit combination gear 1 from a thrust direction. The second gears 1b have looseness with respect to the first gears 1a and therefore can be coupled smoothly without colliding with the gears 37 of the detachable units 12.

It should be noted that a configuration is possible in which openings are provided on both the front and side of the main unit of the image forming apparatus 11 such that the gears of the detachable units 12 can selectively mesh with the combination gears 1 of the main unit in either the radial direction or the thrust direction. When configured in this manner, a main unit provided with opening portions 24a and 24b on two surfaces is standardized thereby making it possible to change a type in which the detachable units 12 are attached and removed from the front to a type in which they are attached and removed from the side.

Figure 10:
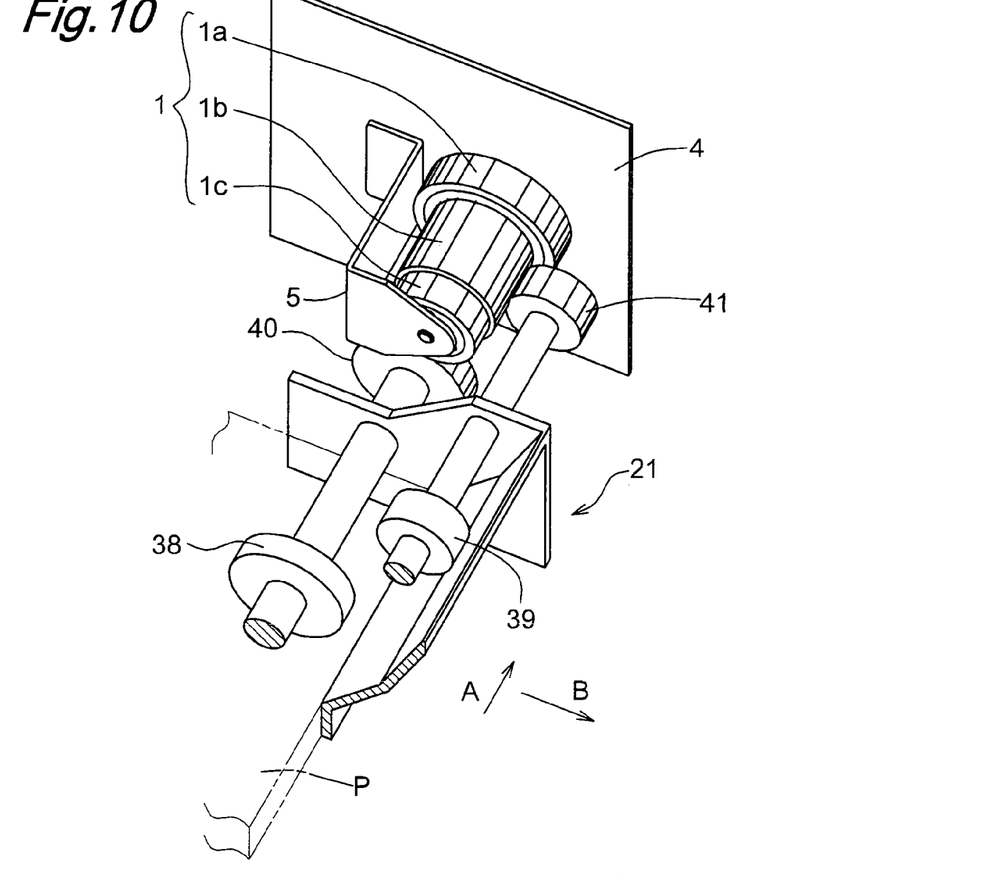
FIG. 10 is a perspective view illustrating a meshing condition of gears between the main unit and the detachable unit of the image forming apparatus using the combination gear according to the present invention.

FIG. 10 shows a configuration in which the combination gear 1 of the present embodiment is provided on the main unit of the image forming apparatus 11 of FIG. 6, and gears of the paper supply unit 21 of FIG. 6 are caused to mesh with the combination gear 1. The combination gear 1 of the main unit is equivalent to the combination gear of FIGS. 1 and 2, and description is omitted by applying same reference numerals to corresponding portions.

The paper supply unit 21 is provided with a pickup roller 38, which picks up papers P stored in an unshown paper supply cassette or the like sheet by sheet from a highest position paper P, and a paper supply roller 39, which feeds out the papers P that have been picked up. A gear 40 that meshes with the third gear 1c of the combination gear 1 of the main unit is provided on an end portion of the shaft of the pickup roller 38, and a gear 41 that meshes with the second gear 1b of the combination gear 1 of the main unit is provided on an end portion of the shaft of the paper supply roller 39.

The paper supply unit 21 can be attached from an arrow A direction, but can also be attached from an arrow B direction. Regardless of from which direction it is mounted, the second gear 1b and the third gear 1c of the combination gear 1 provide looseness as described earlier, and therefore the gear 40 and the third gear 1c as well as the gear 41 and the second gear 1b can be coupled smoothly.

Figure 11:
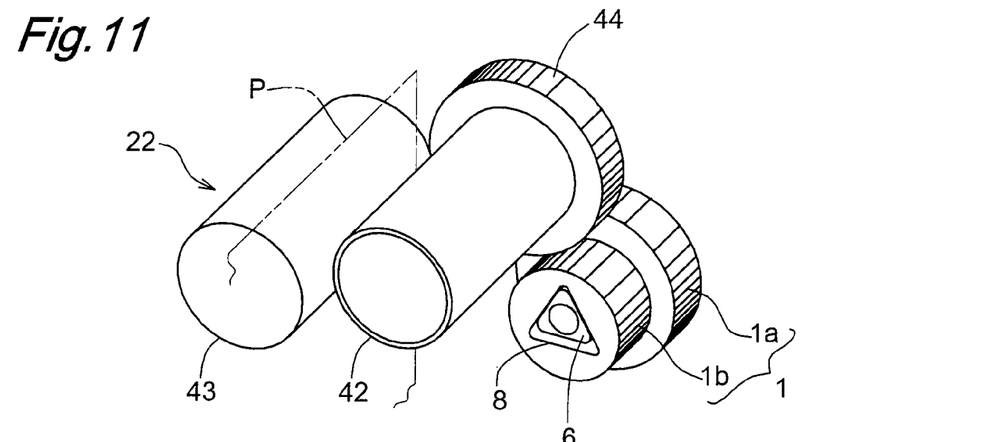
FIG. 11 is a perspective view illustrating a meshing condition of gears between a main unit and a pair of rollers of the image forming apparatus using the combination gear according to the present invention.

FIG. 11 shows a configuration in which the combination gear 1 of the present embodiment is provided on the main unit of the image forming apparatus of FIG. 6, and gears of the fixing unit 22 of FIG. 6 are caused to mesh with the combination gear 1. The combination gear 1 on the main unit side is constituted by the first gear 1a and the second gear 1b and its fundamental configuration is equivalent to the configuration shown in FIGS. 1 and 2, and therefore detailed description is omitted.

The fixing unit 22 is constituted by a heating roller 42 and a pressure roller 43 that presses against the heating roller 42, and is configured such that a paper P on which a toner image has been transferred is caused to pass through a nip area between the heating roller 42 and the pressure roller 43, thereby fixing the toner image onto the paper P. A gear 44 that meshes with the second gear 1b of the combination gear 1 is provided on a shaft end of the heating roller 42.

Processing jams of the paper P caught between the heating roller 42 and the pressure roller 43 of the fixing unit 22 has conventionally involved providing a one-way clutch on the drive transmission pathway from the unshown motor to the heating roller in order to release the coupling of the gears or to release the pressing force on the nip area to make the pair of rollers easy to rotate, or providing a lever that releases the force by which the pressure roller presses against the heating roller.

In the embodiment of FIG. 11, the combination gear 1 of the present embodiment is provided between the unshown motor of the main unit and the gear 44 of the heating roller 42. When rotation of the combination gear 1 stops, the second gear 1b displaces due to gravity and moves apart from the gear 44 of the heating roller 42 such that the coupling of the second gear 1b and the gear 44 of the heating roller 42 is released. Due to this, the rotation of the pressure roller 43 is freed, and it becomes easy to process the jam of the paper P caught between the heating roller 42 and the pressure roller 43.

The embodiment in FIG. 11 relates to the fixing unit 22, but the same structure can also be applied to an arbitrary pair of rollers using in the image forming apparatus 11 shown in FIG. 6, for example, the timing rollers 25.

Figure 12:
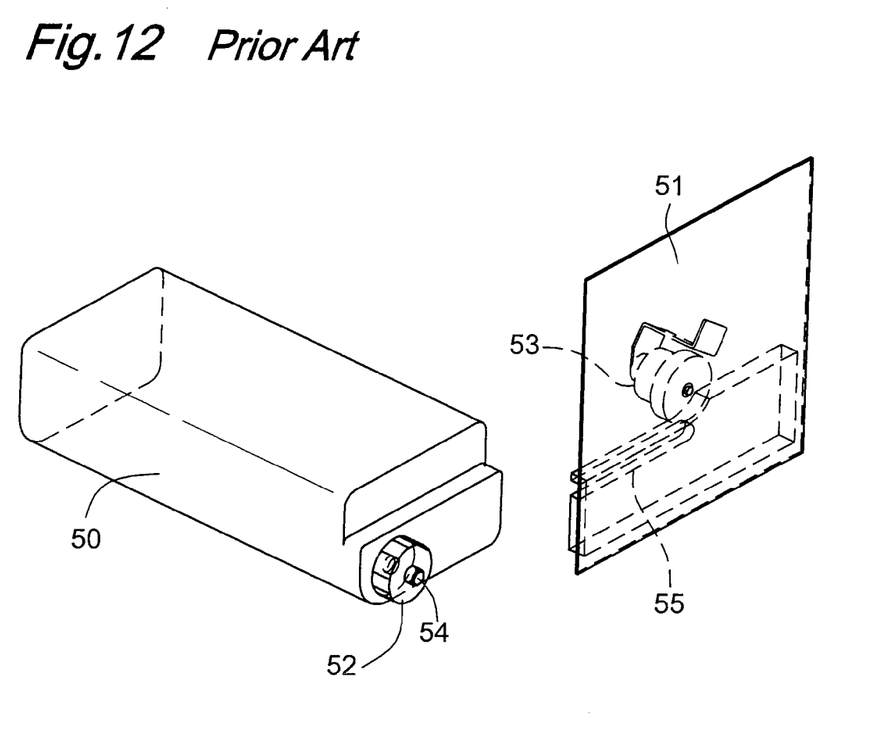
FIG. 12 is a perspective view for describing meshing of gears between a main unit and a detachable unit of an image forming apparatus using a conventional two-stage type gear.
Figure 13:
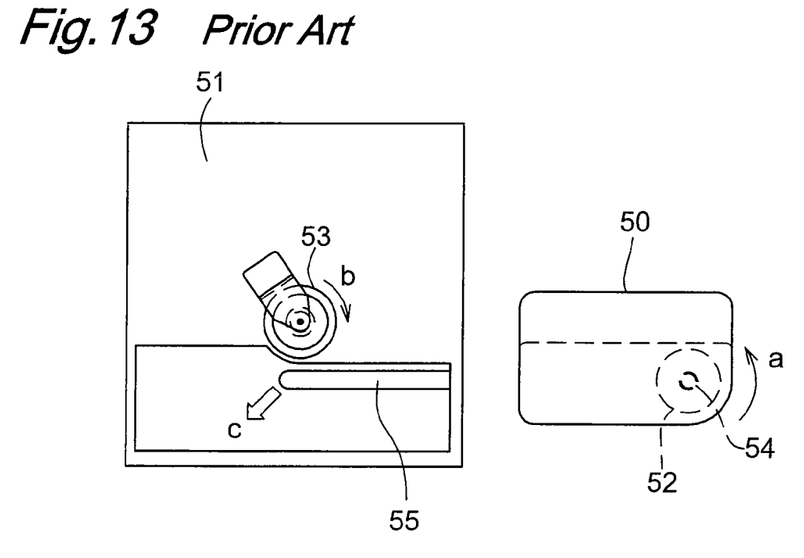
FIG. 13 is a lateral view illustrating a positional relationship between the two-stage type gear of the main unit and the gear of the detachable unit in FIG. 12.
Figure 14:
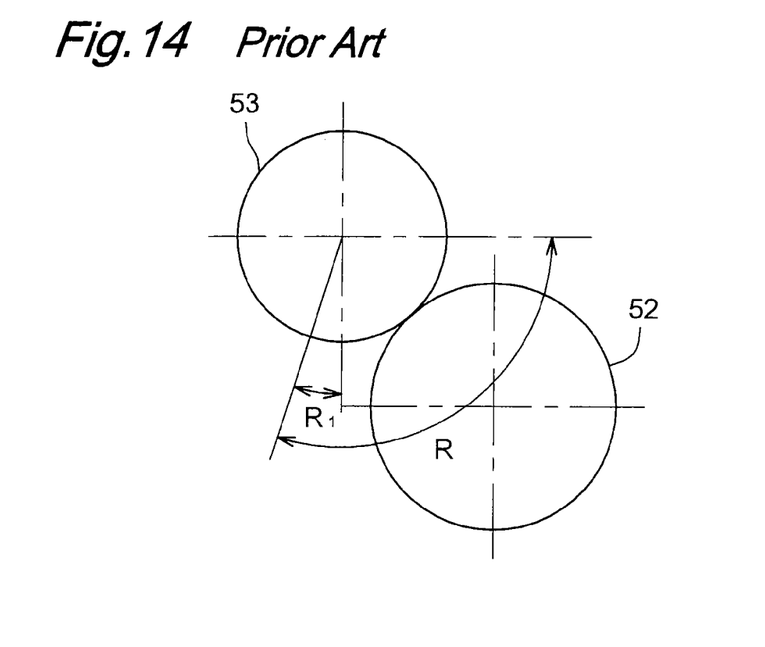
FIG. 14 is an axial view illustrating a coupling position between the two-stage type gear and the gear of the detachable unit in FIG. 13.
Figure 15:
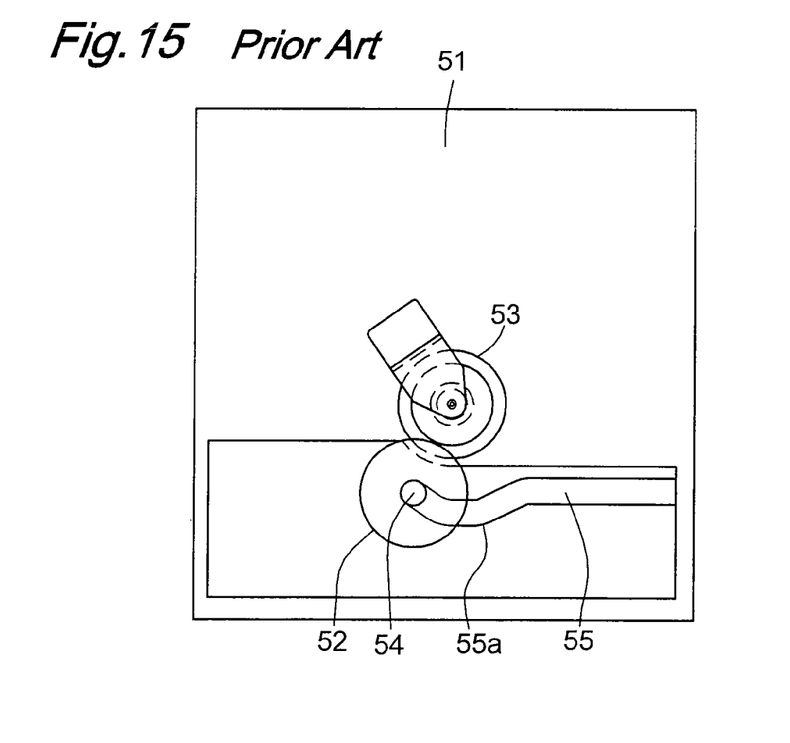
FIG. 15 is a lateral view illustrating a meshing condition between the two-stage type gear of a main unit in which a circular arc guide groove is provided in an extended manner and the gear of the detachable unit.

FIG. 12 shows a conventional condition in which a detachable unit 50 such as a consumables cartridge is mounted to a main unit 51 of an image forming apparatus. An integrally formed two-stage gear 53 is provided on the main unit 51 of the image forming apparatus, and a gear 52 that meshes with a pinion of the two-stage gear is provided on the detachable unit 50. When a shaft 54 of the gear 52 of the detachable unit 50 is mounted along a guide groove 55 formed on an inner wall of the main unit 51 of the image forming apparatus, the gear 52 of the detachable unit 50 and the pinion of the two-stage gear 53 of the main unit mesh, and power is transmitted from the main unit side to the detachable unit. In order for the shaft to be biased in an arrow c direction in consideration of the weight of the detachable unit 50 when the gear 52 of the detachable unit 50 rotates in an arrow a direction and the two-stage gear 53 of the main unit rotates in an arrow b direction as shown in FIG. 13, it is preferable that the coupling position is in a range from a horizontal 0° position to an approximately 110° position clockwise as shown by a range R in FIG. 14. However, in regard to a range $R_1$ from 90° to 110° within the range R, when the guide groove 55 is a straight line, the tooth tops and tooth bottoms of the gear 52 and the gear 53 collide against each other undesirably, and therefore this range $R_1$ cannot be set as the coupling position. Accordingly, as shown in FIG. 15, it has been necessary to provide a guide groove 55a, which is bent downward below the two-stage gear 53, extending from the guide groove 55. This involves moving the detachable unit 50 downward during attaching and removal operations, and therefore a space proportional to this is necessary, which is a problem in that the apparatus increases in size.

In this case, it is conceivable to set a diameter of a root circle of the two-stage gear 53 smaller than usual so that the tooth tops of the gear 52 do not contact the tooth bottoms, but this increases the tooth height and the strength of the tooth root becomes insufficient. Furthermore, this involves pushing in the detachable unit 50 until the coupling position while rotating the gear of the two-stage gear 53, and therefore in a case where the rotational torque of the gear 52 and the two-stage gear 53 is large, the operability of pushing in the detachable unit 50 is poor.

Figure 16:
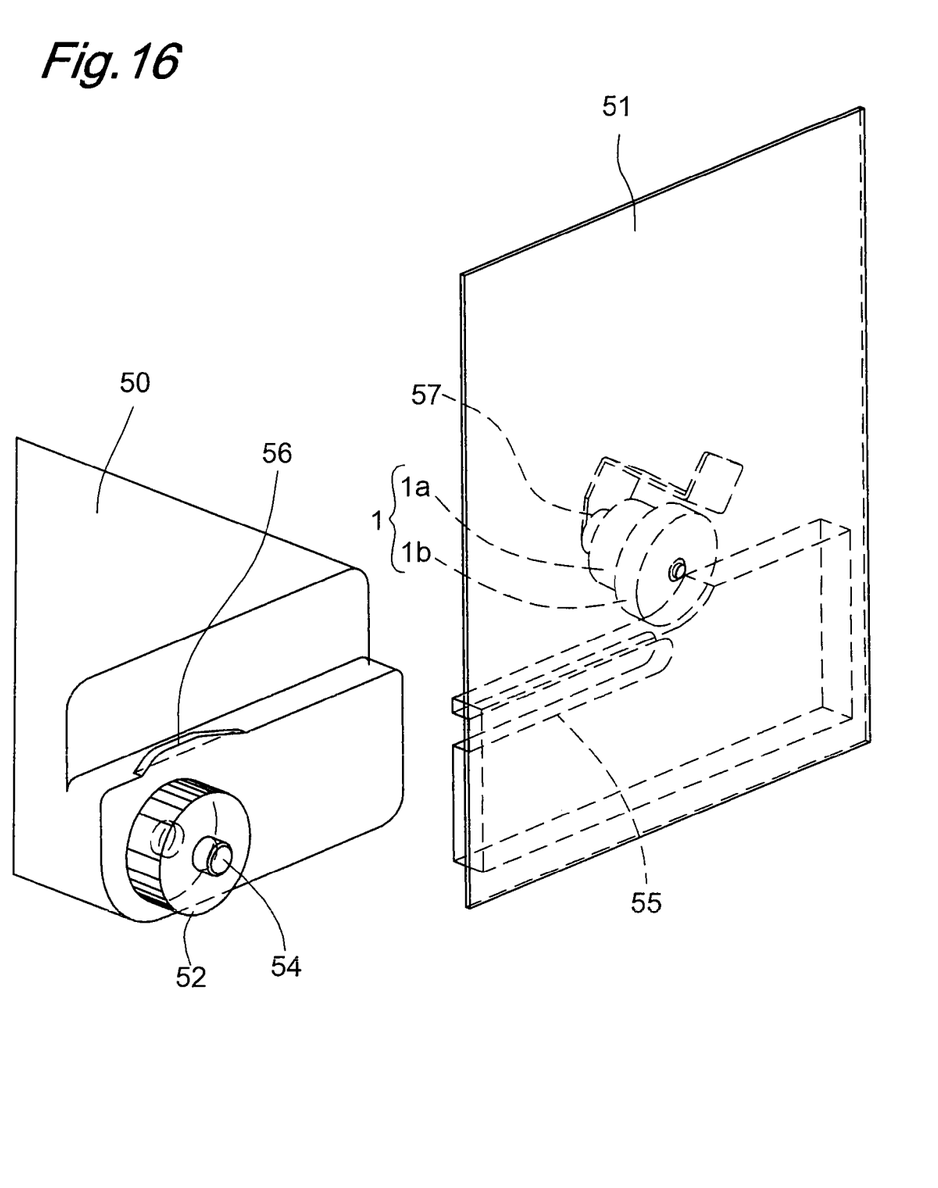
FIG. 16 is a perspective view for describing meshing of gears between the main unit and the detachable unit of an image forming apparatus using the combination gear according to the present invention.

In contrast to this, in the present embodiment, the combination gear 1 of the present embodiment, which is constituted by the first gear 1a and the second gear 1b, is provided on the main unit 51 as shown in FIG. 16, and therefore the second gear 1b is loose and displaced downward due to gravity when the combination gear 1 is not rotating. For this reason, when mounting the detachable unit 50 along the guide groove 55 formed in a straight line, the gear 52 of the detachable unit 50 pushes up the second gear 1b of the combination gear 1 when the gear 52 passes below the combination gear 1, and therefore the conventional problem described above can be avoided.

In order to make the mounting of the detachable unit 50 even smoother, a guide rib 56 is provided extending in a attaching/detaching direction in a vicinity of the gears of the detachable unit 50 as shown in FIG. 16. The guide rib 56 may be set to contact an outer peripheral surface of a boss 57 of an edge surface of the second gear 1b of the combination gear 1 of the main unit 51, and to have a height for pushing up in a radial direction within the range of looseness of the second gear 1b.

Figure 17:
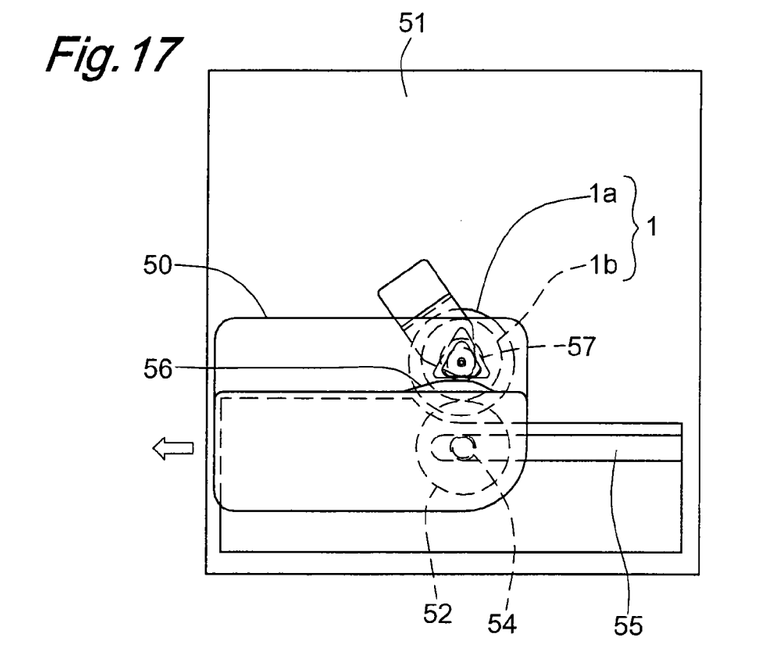
FIG. 17 is a lateral view illustrating a midway meshing condition between the combination gear of the main unit and the gear of the detachable unit.
Figure 18:
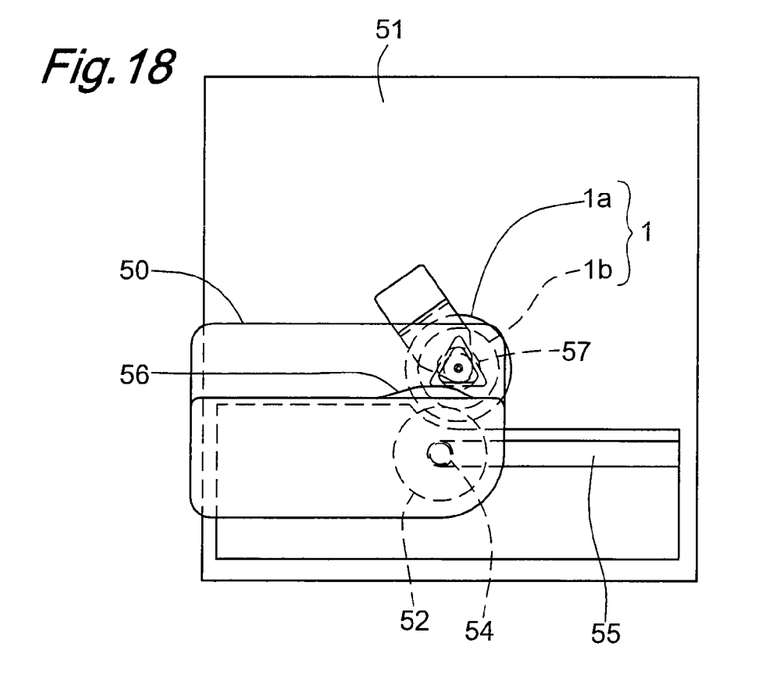
FIG. 18 is a lateral view illustrating a completed meshing condition between the combination gear of the main unit and the gear of the detachable unit.

When the detachable unit 50 is to be mounted, before the tooth tops of the gear 52 of the detachable unit 50 contact the tooth tops of the second gear 1b of the combination gear 1, the guide rib 56 contacts the boss 57 of the second gear 1b as shown in FIG. 17 such that the second gear 1b retracts, and upon reaching the coupling position in FIG. 18, the guide rib 56 separates from the boss 57 of the second gear 1b such that the gear 52 and the second gear 1b mesh. In this manner, the detachable unit 50 can be mounted easily without increasing the push-in force of the detachable unit 50, and the gear 52 and the second gear 1b can be caused to mesh securely. Furthermore, since the coupling range can be widened, a degree of freedom of gear arrangement is increased, and the degree of freedom of component arrangement is also increased along with this, and as a result efficient arrangement is made possible, which enables device compactness to be achieved.

As long as the three engaging portions are arranged in a regular triangle form, there is no limitation to the shape of the engaging portions. For example, the three engaging portions may be respectively columnar with a space between each of the engaging portions, and the three engaging portions may be provided at vertexes of a triangle with a plane surface, a concave surface, or convex surface formed between each of the engaging portions. Furthermore, the three engaging portions may be formed as vertexes of a regular triangle columnar shaft portion provided at an end of the gear.

Although the present invention has been fully described by way of the examples with reference to the accompanying drawing, it is to be noted that various changes and modifications will be apparent to those skilled in the art. Therefore, unless such changes and modifications otherwise depart from the spirit and scope of the present invention, they should be construed as being included therein.

With a combination gear according to the first aspect of the present invention, at a time of stopping, the engaging portions and the engaging hole move in a direction orthogonal to the axial line by a play amount and become eccentric, and therefore the two adjacent gears become displaced from each other, and coupling of the driving gear can be carried out easily. For this reason, a one-way mechanism becomes unnecessary, and a combination gear having a simple structure can be provided at low cost without increasing a number of components.

With a detachable unit according to the second aspect of the present invention, when the combination gear of the detachable unit stops, the engaging portions and the engaging hole move in a direction orthogonal to the axial line by a play amount and become eccentric, and therefore coupling with the driving gear of the apparatus main unit becomes easy. Furthermore, the combination gear of the detachable unit can couple with the driving gear of the main unit from either a radial direction or a thrust direction.

With an image forming apparatus according to the third aspect of the present invention, when the combination gear of the main unit stops, the engaging portions and the engaging hole move in a direction orthogonal to the axial line by a play amount and become eccentric, and therefore coupling with the detachable unit becomes easy. Furthermore, the detachable unit can couple with the combination gear of the main unit from either a radial direction or a thrust direction.

With an image forming apparatus according to the fourth aspect of the present invention, coupling between a gear provided on either one of the pair of rollers and the driving gear becomes easy. Furthermore, when the driving gear of the main unit stops, the engaging portions and the engaging hole move in a direction orthogonal to the axial line by a play amount and become eccentric, and therefore the pair of rollers can be separated easily, which facilitates jam processing of paper caught between the pair of rollers.

What is claimed is:

1. A combination gear, comprising:
   at least two gears adjacent in an axial line direction and having a same rotation direction,
   wherein three engaging portions arranged in a regular triangle are formed at an end of one of the adjacent gears and a regular triangle engaging hole is formed at an end of another gear, and the engaging portions and the engaging hole fit together with play remaining, and
   when one of the gears rotates, the three engaging portions and three surfaces of the engaging hole engage such that the other gear rotates coaxially, and when rotation stops, the engaging portions and the engaging hole move in a direction orthogonal to the axial line by a play amount and become eccentric.

2. The combination gear according to claim 1, wherein the three engaging portions are formed as vertexes of a regular triangle columnar shaft portion provided at an end of the gear.

3. The combination gear according to claim 1, wherein a circumscribed circle of the three engaging portions is larger than an inscribed circle of the engaging hole.

4. A detachable unit, which is detachably mounted on a main unit of an image forming apparatus and to which driving force is transmitted from a driving gear provided on the main unit, wherein
   the detachable unit comprises the combination gear according to any of claims 1 to 3, and
   when the detachable unit is mounted on the main unit, the combination gear of the detachable unit meshes with the driving gear of the main unit.

5. An image forming apparatus comprising a detachable unit, which is detachably mounted on a main unit of the image forming apparatus and to which driving force is transmitted from a driving gear provided on the main unit, wherein the driving gear of the main unit comprises the combination gear according to any of claims 1 to 3, and when the detachable unit is mounted on the main unit, a gear of the detachable unit meshes with the combination gear of the main unit.

6. The image forming apparatus according to claim 5, wherein the gear of the detachable unit meshes with the combination gear of the main unit of the image forming apparatus from a radial direction.

7. The image forming apparatus according to claim 5, wherein the gear of the detachable unit meshes with the combination gear of the main unit of the image forming apparatus from a thrust direction.

8. The image forming apparatus according to claim 5, wherein the gear of the detachable unit can selectively mesh with the combination gear of the main unit of the image forming apparatus in a radial direction or a thrust direction.

9. The image forming apparatus according to claim 6, wherein a coupling position of the gear of the detachable unit and the combination gear of the main unit is an inner side from a rotation center of the combination gear of the main unit as viewed from a mounting direction of the detachable unit.

10. The image forming apparatus according to claim 5, wherein the detachable unit comprises at least two gears that mesh with at least two gears respectively of the combination gear of the main unit.

11. An image forming apparatus, which comprises in a main unit thereof a pair of rollers through which paper passes and a driving gear that meshes with a gear provided on either one of the pair of rollers, wherein the driving gear of the main unit comprises the combination gear according to any of claims 1 to 3.

12. The image forming apparatus according to claim 11, wherein the pair of rollers is a pair of fixing rollers constituted by a pressure roller and a heating roller.

13. The image forming apparatus according to claim 11, wherein the pair of rollers is a pair of paper transport rollers constituted by a driving roller and a driven roller.

* * * * *